United States Patent
Radmanic et al.

(10) Patent No.: US 7,552,965 B2
(45) Date of Patent: Jun. 30, 2009

(54) CRUSH PROTECTION FOR AN OPENABLE VEHICLE ROOF

(75) Inventors: Stjepan Radmanic, Mammendorf (DE); Josef Appel, Gauting (DE)

(73) Assignee: Webasto AG, Stockdorf (DE)

( * ) Notice: Subject to any disclaimer, the term of this patent is extended or adjusted under 35 U.S.C. 154(b) by 148 days.

(21) Appl. No.: 10/599,493

(22) PCT Filed: Mar. 23, 2005

(86) PCT No.: PCT/EP2005/003108

§ 371 (c)(1),
(2), (4) Date: Sep. 29, 2006

(87) PCT Pub. No.: WO2005/093196

PCT Pub. Date: Oct. 6, 2005

(65) Prior Publication Data
US 2007/0200394 A1 Aug. 30, 2007

(30) Foreign Application Priority Data
Mar. 29, 2004 (DE) .................. 10 2004 015 296

(51) Int. Cl.
*B60J 7/00* (2006.01)
*B60J 10/12* (2006.01)

(52) U.S. Cl. ..................... 296/216.06; 296/216.07; 296/216.09

(58) Field of Classification Search ............ 296/216.03, 296/216.06–216.07, 216.09, 219
See application file for complete search history.

(56) References Cited

U.S. PATENT DOCUMENTS

| 4,466,656 | A | * | 8/1984 | Igel ................. 296/216.02 |
| 4,561,691 | A | | 12/1985 | Kawai et al. |
| 4,925,237 | A | * | 5/1990 | Bohn et al. ........... 296/216.09 |
| 5,310,241 | A | * | 5/1994 | Omoto et al. ............ 296/219 |
| 5,851,051 | A | * | 12/1998 | Schmidhuber et al. . 296/216.06 |
| 6,273,500 | B1 | * | 8/2001 | Boersma et al. ....... 296/216.09 |
| 6,315,355 | B1 | * | 11/2001 | Lamm et al. ............ 296/213 |
| 6,617,812 | B2 | | 9/2003 | Nagashima et al. |

FOREIGN PATENT DOCUMENTS

EP 0870892 A2 10/1998
GB 2250779 * 6/1992

* cited by examiner

*Primary Examiner*—Dennis H Pedder
(74) *Attorney, Agent, or Firm*—Marshall, Gerstein & Borun LLP

(57) ABSTRACT

An openable motor vehicle roof with a movable roof element which at least partially clears a roof opening bounded by a body-mounted frame component in the area of which a seal element is located and against which the roof element rests when the roof opening is closed. An electric motor drive for moving the roof element is monitored and which is turned off and optionally reversed, when a interfering body is detected between the roof element and the edge area of the roof opening. A stop surface is provided on the roof element for detecting an interfering body, and the motor vehicle roof is made such that, if there is a interfering body between the edge area of the roof opening and the roof element when the roof opening is being closed, the stop surface comes into contact with the interfering body before the roof element engages the seal element.

24 Claims, 4 Drawing Sheets

CRUSH PROTECTION FOR AN OPENABLE VEHICLE ROOF

BACKGROUND OF THE INVENTION

1. Field of the Invention

This invention relates to an openable motor vehicle roof with a movable roof element for selectively closing and at least partially clearing a roof opening, a body-mounted frame component which extends over at least one edge area of the roof opening, a seal element which is located in the area of the frame component, and against which the roof element rests when the roof opening is being closed, an electric motor drive for moving the roof element, and a monitoring means which is coupled to the drive and which evaluates the drive parameters derived from the drive and turns off and optionally reverses the drive when it is recognized using the evaluation of the drive parameters that there is a interfering body between the roof element and the edge area of the roof opening.

2. Description of Related Art

In motor vehicles, for closing elements, especially electrically actuated windows, automatically closing doors or electrically activated roofs, which are actuated by an outside force, two types of crush protection devices are used, as is explained, for example, in EP 0 870 892.

In one type of crush protection, pressure-actuated sensor elements are used which are provided on a closing edge and which, when exposed to pressure, turn off or reverse the drive of the closing element. In another type of crush protection, information about possible crushing is taken from the power data of the drive unit for the closing element. In particular, the motor current tapped on the drive or the torque delivered by the drive motor can be monitored, and both rise in the case of crushing. Furthermore, via evaluation of the motor revolutions and/or rpm of the drive the position and/or speed information can be evaluated with respect to the adjustable roof element in order to implement obstacle detection. If predetermined boundary values of the respectively interrogated parameters are not reached or are exceeded, the drive unit is turned off, and optionally, the direction of motion is reversed.

Especially for motor vehicle roofs in which the movable roof element rests against a seal element at the end of its closing motion, crush protection of the latter type often cannot be reliably implemented since the change of the drive parameters caused by the crushed interfering body is superimposed on the change of the drive parameters which is caused by the deformation of the seal element. Especially for motor vehicle roofs in which the roof element for closing the roof opening pivots from overhead against the body-mounted frame, as is the case, for example, for externally guided sliding roofs and also for convertible roofs, the problem also arises that the roof element strikes the interfering body at a relatively acute angle so that the interfering body does not abruptly block the motion of the roof element, but rather leads to gradual jamming of the roof element; this is not necessarily interpreted as crushing of the interfering body by the monitoring means which is coupled to the drive.

SUMMARY OF THE INVENTION

A primary object of this invention is to devise a motor vehicle roof of the initially mentioned type which more reliably recognizes the presence of the interfering bodies than existing crush protection devices and with which especially smaller crushed bodies are more reliably recognized.

In a motor vehicle roof of the initially mentioned type, this is achieved in accordance with the invention in that there is a stop surface on the roof element for detecting an interfering body and that the motor vehicle roof is made such that, if there is a interfering body between the edge area of the roof opening and the roof element when the roof opening is being closed, the stop surface comes into contact with the interfering body before the roof element engages the seal element. Because the stop surface of the roof element comes into contact with the interfering body before the roof element engages the seal element, the increase of the force caused by driving of the roof element as a result of the crushing of the interfering body can be clearly distinguished from the increase of force caused by compression of the seal. This is especially advantageous for small interfering bodies in which the roof element compresses the seal more strongly before the interfering body can cause the drive to be turned off.

In particular, this invention is used in motor vehicle roofs in which, when the roof opening is being closed, the motion of the roof element has a component perpendicular to the roof surface, especially for those in which the roof element rests from obliquely overhead against the seal element when the roof opening is being closed. In these motor vehicle roofs, the seal element accepts relatively great deformation since it must produce not only the compressive force for making available a sealing action, but also must allow the pivoting-in motion of the roof element. Therefore, especially for these motor vehicle roofs it can happen that the interfering body merges into the sealing element so that when the roof element is being closed the change of the drive parameters caused by the deformation of the seal element is superimposed with the signal change caused by the roof element striking the interfering body. Examples of these motor vehicle roofs are especially externally guided sliding roofs (so-called ASD roofs), spoiler roofs and convertible roofs.

Preferably, the stop surface projects above the roof element in the direction of the closing motion of the roof element. This results in that the stop surface strikes the interfering body at an obtuse angle so that a clear increase of force is achieved on the drive which can be clearly recognized by the monitoring means.

The stop surface can be made especially as an edge which projects in the area of the front edge of the roof element. In particular, the stop surface can be made as an extension of the front edge of the roof element in the direction of the closing motion of the roof element.

The production cost of the motor vehicle roof in accordance with the invention can be minimized when the stop surface is simply foamed onto the roof element. In particular, when the roof element has peripheral edge foaming, for example, when the roof element is the transparent cover of a glass roof, the stop surface can be integrated into the peripheral edge foaming so that it is produced at the same time without an additional working step by suitable shaping of the foaming tool when the roof element is foamed.

Preferably, the motor vehicle roof is designed to detect interfering bodies of a thickness of 4 mm or less, measured in the closing direction of the roof element. Advantageously, the motor vehicle roof is made here such that, without providing additional crush protection systems which work with sensors, crushed bodies can be reliably detected as is prescribed in current safety standards, especially in U.S. standard FMVSS 118 and EU Guidelines 74/60, 2000/4 and ECE R21.

As in the known crush protection devices, the monitoring means can be also designed to detect the current consumed by the electric motor drive, the torque delivered by the drive, the number and direction of revolutions of the driven shaft of the drive, the rpm of the drive and/or the positioning speed of the roof element. The detected drive parameters can then be compared to given setpoints in order to stop or reverse the drive when the respective setpoint is exceeded or not reached.

Preferred embodiments of the invention are explained in detail below with reference to the accompanying drawings.

DETAILED DESCRIPTION OF THE INVENTION

Figure 1:
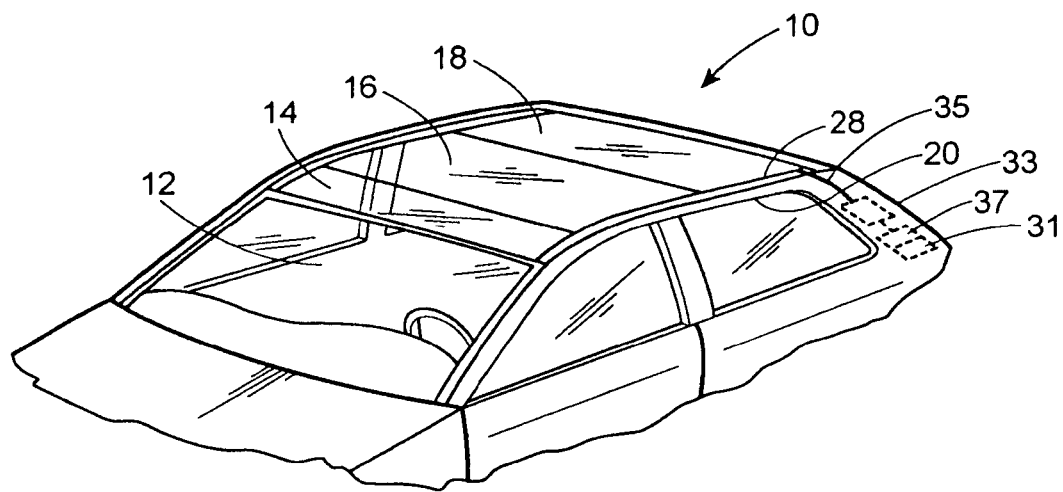
FIG. 1 is a schematic perspective front view of a motor vehicle roof with the cover closed.

The motor vehicle roof 10 shown in FIG. 1 comprises a wind deflector louver 14 which is pivotally located above the windshield 12, a movable cover 16 which is located behind the wind deflector louver 14, and a fixed roof pane 18 which adjoins the closed cover 16. Laterally, the wind deflector louver 14, the cover 16 and the roof pane 18 are each bounded by a side member 20.

Figure 2:
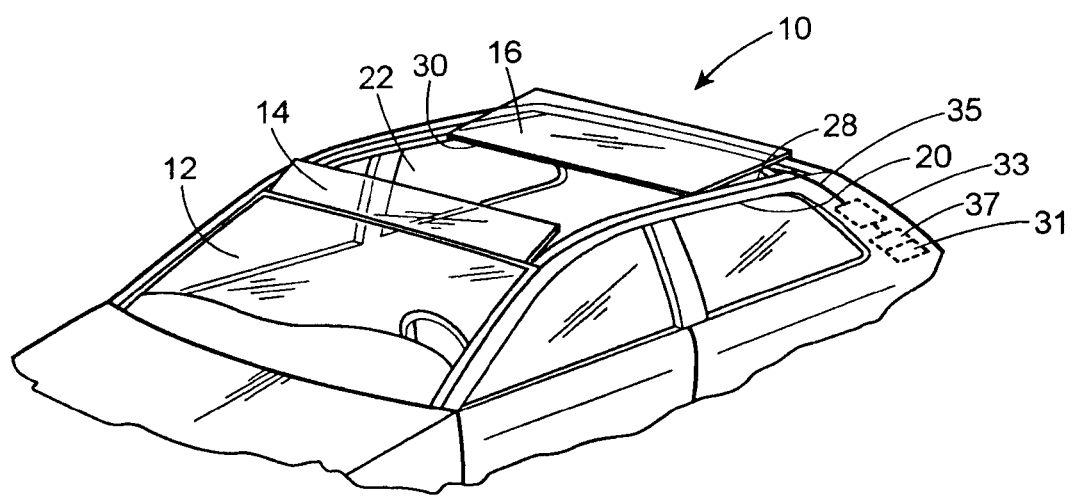
FIG. 2 is a schematic perspective front view of the motor vehicle roof shown in FIG. 1 with the cover completely opened.

In the closed state shown in FIG. 1, the motor vehicle roof 10 provides a completely smooth appearance. Although the cover 16 can be moved to the rear over the fixed roof pane 18 (see, FIG. 2) to clear the roof opening 22, guides located above the fixed vehicle roof 10 are not necessary for this purpose. To raise and move the cover 16 to the rear, the cover 16 is supported instead by means of laterally coupled support levers 26 which can be moved in guides located below the level of the fixed roof skin and which, upon upward emergence, partially displace a flexible seal element 28 which is located between the side members and the components 14, 16, and 18. As shown in FIG. 2, the cover 16 is raised at its rear edge 24 and moved over the fixed roof surface 18 to clear the roof opening 22. The opening size for the roof opening 22 is maximized when the cover 16 is also raised with its front edge 30 over the level of the fixed roof surface.

Figure 3:
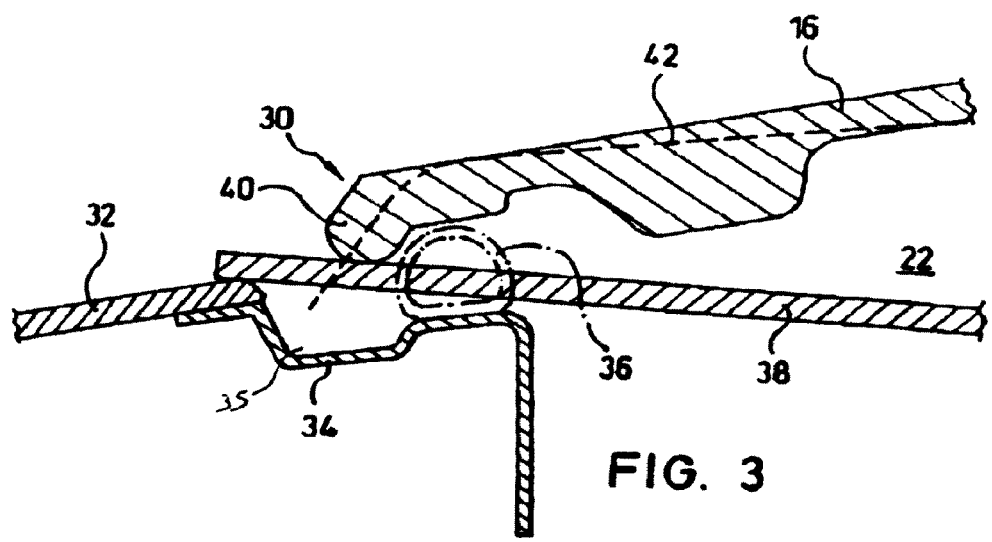
FIG. 3 is a sectional view through the front edge of the motor vehicle roof in accordance with the invention with an interfering body crushed.

FIG. 3 shows a section through the motor vehicle roof of FIG. 1 in the area of the front edge of the roof opening 22. FIG. 3 shows an embodiment in which, instead of the raisable wind deflector louver 14, there is a window element 32, with a roof frame 34 surrounding the roof opening 22 being connected to its underside. In this connection, along the front edge of the roof opening 22, there is a seal element 36 in the roof frame 34 against which the cover 16 rests when the roof opening 22 is being closed. As is indicated by the broken line 42 in FIG. 3, the front edge 30 of the cover 16 moves on a path which is directed obliquely downward with reference to the fixed roof surface when the cover is brought to rest against the seal 36.

Furthermore, FIG. 3 shows a test bar 38 by means of which crushing of an article between the front edge 30 of the cover and the front edge of the roof opening 22 is simulated when the cover 16 is being closed. FIG. 3 shows the state in which the test bar 38 is pressed by the front edge 30 of the cover 16 against the fixed roof frame 34 and is completely immersed into the seal 36 in doing so. Since, in this state, the drive parameters of the electrically driven cover 16 clearly change, especially the torque delivered by the motor, the motor current delivered by the drive motor and the motor revolutions and the rpm of the drive, a monitoring means coupled to the drive of the cover 16 can detect crushing, stop the drive and initiate reversal of motion of the cover 16 in order to release the test bar 38 again. As can furthermore be seen in FIG. 3, on the underside of the front edge 30 of the cover 16, there is a stop surface 40 in the form of a projection which projects in the direction of the closing motion of the cover 16, i.e., along the broken line 42. The manner of action of the projection 40 is explained in detail below using FIG. 4 which shows a known motor vehicle roof in a view similar to that of FIG. 3.

Figure 4:
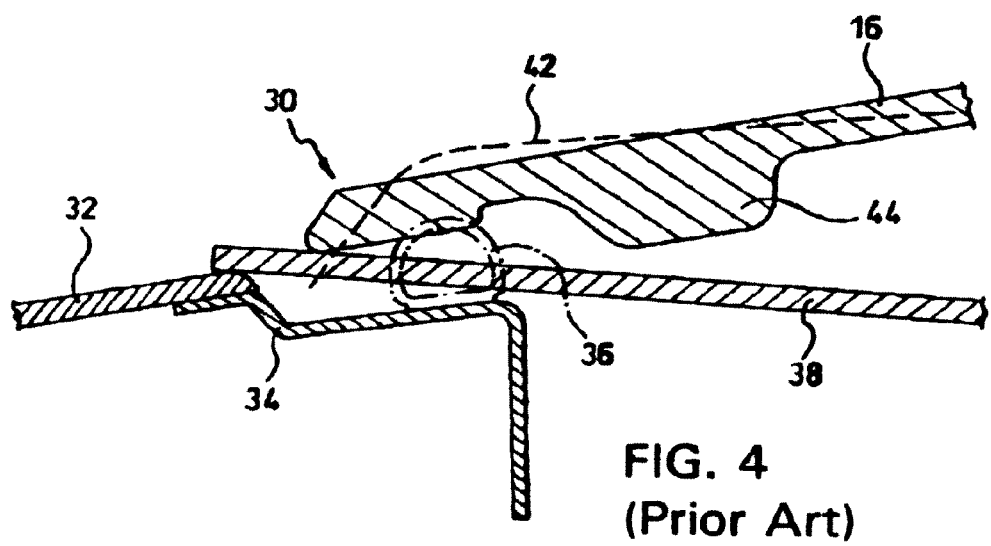
FIG. 4 is a sectional view similar to that of FIG. 3 through a motor vehicle roof according to the prior art.

In the conventional roof as shown in FIG. 4, the cover 16 is made as a component which is flat with the exception of a bulge 44 to which the support levers for raising the cover are connected, and which rests with the underside of its front edge against the seal 36 when swung into the roof opening 22. In such a roof, if there is a test piece or a crushed body in the area of the front edge of the roof opening, such a crushed body, especially when it is relatively small, cannot be reliably detected by the drive 35 of the cover 16. This can be attributed, on the one hand, to the motion of the front edge of the cover which is pointed obliquely down, and which tries to yield to the front when it strikes the test bar 38, i.e., to slide onto the test bar. Due to the sliding increase of the crushing force, an insufficient reaction on the electric motor drive 35 which could be detected by the crush protection system takes place. It is even more serious that, for a relatively small crushed body, the front edge 30 of the cover 16 strikes the seal 36 and deforms it before it strikes the test bar 38. Therefore, the increase of force which can be established on the drive 35 and which is caused by the unintentional crushing of a crushed body cannot be clearly distinguished from the braking of the cover caused in normal undisrupted operation of the motor vehicle roof when plunging into the seal 36.

This invention devises a remedy here in a very simple, but extremely effective manner by, as shown in FIG. 3, the stop surface 40 being on the cover 16 for detecting the interfering body 38 which comes into contact with the interfering body 38 before the cover 16 engages the sealing element 36. Depending on the geometry of the frame 34 and the seal 36, small crushed bodies 38 can be detected by the corresponding configuration of the projection 40. The body-mounted frame component 34 includes a depression 35 in front of and below the seal element 36 for receiving at least a portion of the projection 40 when the movable cover 16 is in a closed position. In order to prevent the stop surface from sliding onto the test piece 38, as is the case in existing roofs (see FIG. 4), the stop surface 40 is preferably arranged such that it projects in the direction of the closing motion 42 of the cover 16 so that it strikes the test piece 38 at an angle that is as oblique as possible.

Figure 5:
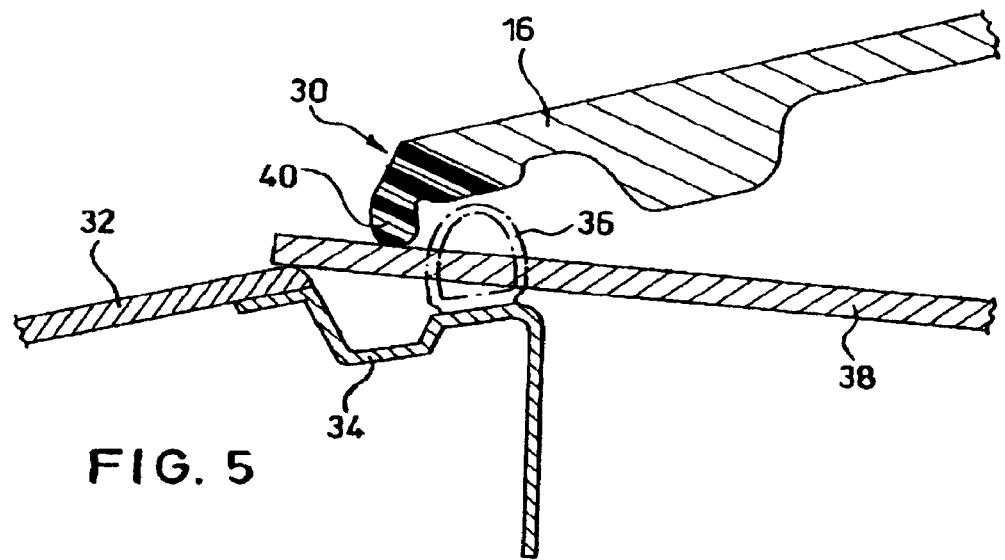
FIGS. 5 to 7 are sectional views similar to that of FIG. 3 but showing modified embodiments of the motor vehicle roof of the invention.
Figure 6:
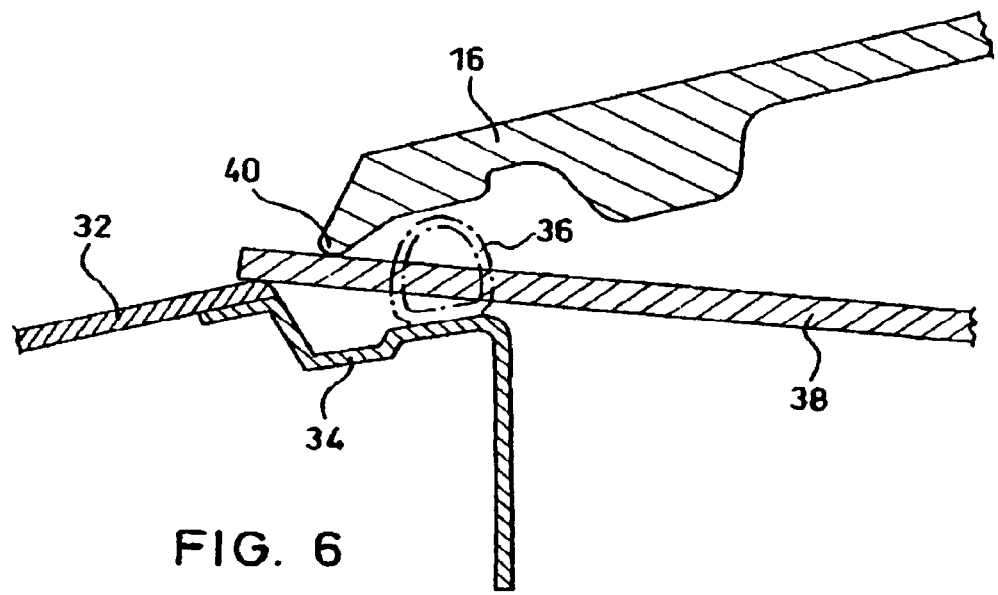
Figure 7:
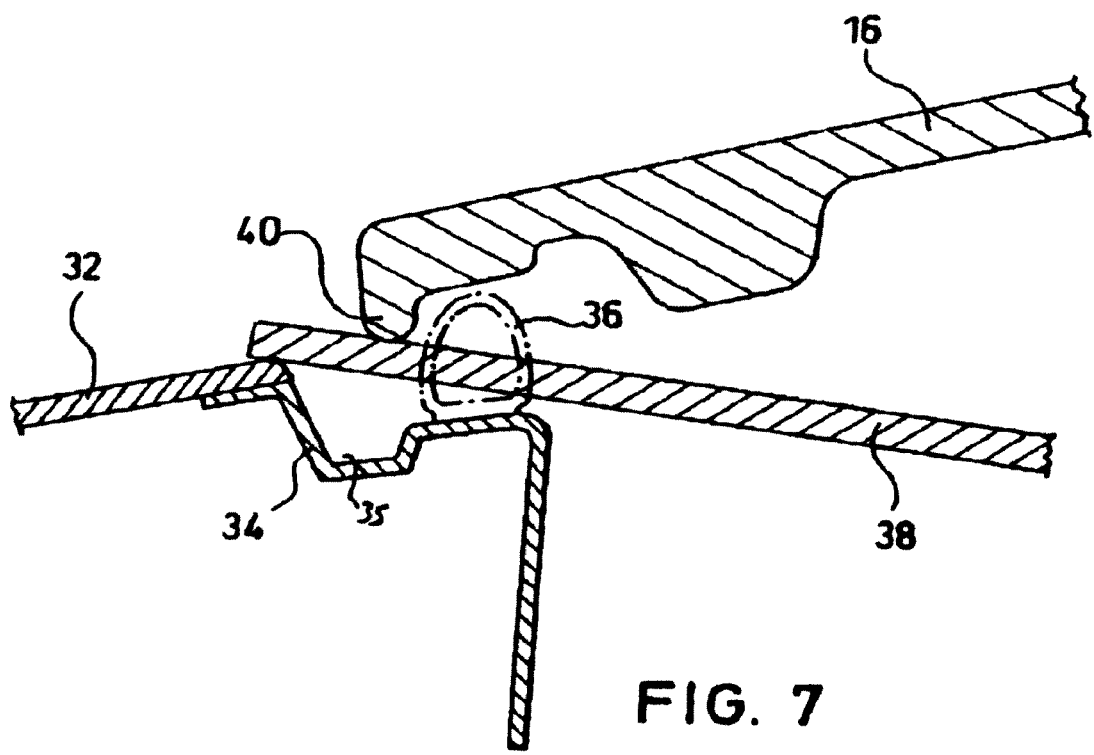

Other versions of the stop surface 40 are shown in FIGS. 5, 6 and 7 in views similar to FIG. 3. Preferably, the stop surface 40 is made in one piece with the front edge 30 of the cover 16. This can be easily accomplished especially for covers which have peripheral foaming, for example, of PU foam by suitable shaping of the foaming tool.

With the concept proposed here, especially also smaller crushed bodies which were often not correctly detected by existing crush protection systems, can be detected. By earlier detection accomplished by means of the stop surface, moreover the reliability of the system is increased. The concept proposed here is especially suited for use in motor vehicle roofs in which a movable roof element is placed from overhead or from obliquely overhead against a seal element, such as, for example, for externally guided sliding roofs (ASD roofs). Making available relatively expensive direct crush protection systems which operate with sensors can thus be circumvented by a relatively simple geometrical configuration of the front edge of the cover.

What is claimed is:

1. Openable motor vehicle roof, comprising:
   a roof opening having a front edge and a rear edge,
   a movable roof element mounted within the roof opening for selectively closing and at least partially clearing the roof opening, the movable roof element having a front edge and a closing motion of the roof element being directed obliquely downwardly and forwardly with reference to the roof opening,
   an angled projection extending from the front edge of the movable roof element,
   a body-mounted frame component which extends over the front edge of the roof opening, and
   a seal element affixed to the frame component, and against which the movable roof element rests from obliquely overhead when the roof opening is closed,
   wherein the projection extends from the front edge in the closing motion of the movable roof element, a recessed area defined by the movable roof element and the projection receives at least a portion of the seal rearwardly of the projection while the closing motion brings the movable roof element toward the closed position such that the projection contacts an interfering body before the roof element engages the seal element, if the interfering body is present between the frame component and the movable roof element, and the projection contacts a portion of the interfering body that is level with or below an upper surface of the seal.

2. Openable motor vehicle roof as claimed in claim 1, in which the closing motion of the movable roof element includes a component perpendicular to a fixed roof surface.

3. Openable motor vehicle roof as claimed in claim 2, in which the movable roof element engages against the seal element from obliquely overhead when the roof opening is being closed.

4. Openable motor vehicle roof as claimed in claim 1, wherein the movable roof element is mounted in a manner producing a motion of the movable roof element upward to above a fixed roof surface to clear the roof opening.

5. Openable motor vehicle roof as claimed in claim 1, wherein the projection is an extension of the front edge of the movable roof element that extends in the direction of closing motion of the movable roof element.

6. Openable motor vehicle roof as claimed in claim 1, in which the seal element lies behind the projection in the lengthwise direction of the motor vehicle roof in the closed position of the movable roof element.

7. Openable motor vehicle roof as claimed in claim 1, in which the projection extends essentially over the entire width of the movable roof element front edge.

8. Openable motor vehicle roof as claimed in claim 1, in which the projection is affixed onto the movable roof element and comprises foam.

9. Openable motor vehicle roof as claimed in claim 1, wherein the projection is affixed onto a peripheral edge of the movable roof element and comprises foam.

10. Openable motor vehicle roof as claimed in claim 1, wherein the projection projects from the movable roof element front edge a length sufficient to engage interfering bodies having a thickness of about 4 mm measured in the closing direction of the movable roof element prior to the movable roof element contacting the seal element.

11. Openable motor vehicle roof as claimed in claim 1, further comprising:
   a drive with an electric motor for moving the movable roof element, and
   a monitor, which is coupled to the drive, for evaluating drive parameters derived from the drive, and for one of turning off and reversing the drive when evaluation of one or more drive parameters indicates that there is an interfering body between the seal element and the projection,
   wherein the monitor is adapted to detect one or more parameter of the drive including current consumed by the electric motor drive, torque delivered by the drive, number and direction of revolutions of a driven shaft of the drive, rpm of the drive and positioning speed of the movable roof element.

12. Openable motor vehicle roof, comprising:
   a roof opening having a front edge and a rear edge,
   a movable roof element mounted within the roof opening for selectively closing and at least partially clearing the roof opening, the movable roof element having a front edge and a closing motion of the roof element directed obliquely downwardly and forwardly with reference to the roof opening,
   an angled projection extending from the front edge of the movable roof element,
   a body-mounted frame component which extends over the front edge of the roof opening, and
   a seal element affixed to the frame component, and against which the movable roof element rests from obliquely overhead when the roof opening is closed,
   wherein the projection extends from the front edge in the closing motion of the movable roof element, a recessed area defined by the movable roof element and the projection receives at least a portion of the seal rearwardly of the projection while the closing motion brings the movable roof element toward the closed position such that the projection contacts an interfering body before the roof element engages the seal element, if the interfering body is present above the frame component and the movable roof element, the body-mounted frame component includes a depression in front of and below the seal element for receiving at least a portion of the projection when the movable roof element is in a closed position, and the projection contacts a portion of the interfering body that is level with or below an upper surface of the seal.

13. Openable motor vehicle roof as claimed in claim 12, in which the closing motion of the movable roof element includes a component perpendicular to a fixed roof surface.

14. Openable motor vehicle roof as claimed in claim 13, in which the movable roof element engages against the seal element from obliquely overhead when the roof opening is being closed.

15. Openable motor vehicle roof as claimed in claim 12, wherein the movable roof element is mounted in a manner producing a motion of the movable roof element upward to above a fixed roof surface to clear the roof opening.

16. Openable motor vehicle roof as claimed in claim 12, wherein the projection is an extension of the front edge of the movable roof element that extends in the direction of closing motion of the movable roof element.

17. Openable motor vehicle roof as claimed in claim 12, in which the seal element lies behind the projection in the lengthwise direction of the motor vehicle roof in the closed position of the movable roof element.

18. Openable motor vehicle roof as claimed in claim 12, in which the projection extends essentially over the entire width of the movable roof element front edge.

19. Openable motor vehicle roof as claimed in claim 12, in which the projection is affixed onto the movable roof element and comprises foam.

20. Openable motor vehicle roof as claimed in claim 12, wherein the projection is affixed onto a peripheral edge of the movable roof element and comprises foam.

21. Openable motor vehicle roof as claimed in claim 12, wherein the projection projects from the movable roof element front edge a length sufficient to engage interfering bodies having a thickness of about 4 mm measured in the closing direction of the movable roof element prior to the movable roof element contacting the seal element.

22. Openable motor vehicle roof as claimed in claim 12, further comprising:
  a drive with an electric motor for moving the movable roof element, and
  a monitor, which is coupled to the drive, for evaluating drive parameters derived from the drive, and for one of turning off and reversing the drive when evaluation of one or more drive parameters indicates that there is an interfering body between the seal element and the projection,
 wherein the monitor is adapted to detect one or more parameter of the drive including current consumed by the electric motor drive, torque delivered by the drive, number and direction of revolutions of a driven shaft of the drive, rpm of the drive and positioning speed of the movable roof element.

23. Openable motor vehicle roof as claimed in claim 12, wherein the closing motion causes the projection to contact the interfering body at an oblique angle before the roof element engages the seal element.

24. Openable motor vehicle roof as claimed in claim 1, wherein the closing motion causes the projection to contact the interfering body at an oblique angle before the roof element engages the seal element.

* * * * *